United States Patent [19]

Daigle et al.

[11] 3,751,640

[45] Aug. 7, 1973

[54] CODE READING SYSTEM

[75] Inventors: Jack R. Daigle, Grand Rapids Twp., Kent County; James D. Habegger, Thornapple Twp., Barry County; Howard A. Zollinger, Ada Twp., Kent County; Clayton H. Vander Meer, Wyoming, all of Mich.

[73] Assignee: Rapistan, Inc., Grand Rapids, Mich.

[22] Filed: Feb. 14, 1972

[21] Appl. No.: 225,824

[52] U.S. Cl. ..... 235/61.11 E, 235/61.12 R, 198/38, 104/88

[51] Int. Cl. .......................... G02b 5/12, G06k 7/10

[58] Field of Search ............. 235/61.12 R, 61.12 C, 235/61.12 N, 61.12 M, 61.11 E, 61.11 D; 104/88; 40/1.6; 198/38

[56] References Cited

UNITED STATES PATENTS

| | | | |
|---|---|---|---|
| 3,074,353 | 1/1963 | Devonshire et al. | 235/61.12 M |
| 3,317,714 | 5/1967 | Hausler et al. | 235/61.12 R |
| 3,227,886 | 1/1966 | Dunigan et al. | 198/38 |
| 3,560,073 | 2/1971 | Knapp | 198/38 |
| 3,496,341 | 2/1970 | Mizuta et al. | 345/61.11 E |
| 3,229,073 | 1/1966 | Macker et al. | 235/61.11 E |
| 3,538,311 | 11/1970 | Weidmann | 235/61.11 D |

*Primary Examiner*—Thomas A. Robinson
*Attorney*—Peter P. Price, Daniel Van Dyke et al

[57] ABSTRACT

A logic card is moveable along a conveyor with a carrier or article through a reading station having a plurality of arrangeable light sources on one side and a like plurality of arrangeable light sensors on the other side. The logic card includes moveable blocks in one or more elongated slots which are arrangeable to define one or more patterns of openings permitting the light sources and sensors to communicate under certain conditions to initiate a conveyor dispatch function. The logic card includes a stationary opening which functions to key or arm the reading station to take a reading only when the card is in proper position.

17 Claims, 13 Drawing Figures

Patented Aug. 7, 1973

3,751,640

4 Sheets-Sheet 4

CODE READING SYSTEM

BACKGROUND OF THE INVENTION

1. Field of Invention

This invention relates to apparatus for dispatching articles to and from destinations along a conveyor. More particularly, the invention pertains to the control of load carriers such as trolleys by actuating various dispatch functions such as switches in accordance with a preselected code and code reading system.

2. Description of The Prior Art

Known systems for automatically classifying or dispatching articles movable on a conveyor include a coding device movable with the article or load carrier which is read by passing through a reading station which utilizes mechanical or electro-mechanical interplay between the reader and coding device; magnetic interplay between the reader and coding device; and retro-reflective tape on the coding device which reflects a light beam under certain conditions to actuate a reading or dispatch function. A significant problem with all of these devices is the necessity of relatively high tolerance guidance of the article or carrier through the reading station to assure accurate reading. Uneven loading of the carrier and normal vibration and sway have caused an unacceptable occurrence rate of false readings and required additional guidance structure at the reading station to insure proper alignment.

Another general drawback common to known systems is the lack of a simple coding device which can be easily set to reflect a large number of individual, group or series of codes. Conversely, as the flexibility of the device increases, the complexity has likewise increased resulting in higher costs and tolerances. As the complexity increases, so does the necessary training and skill of the operators.

Still another drawback to many of the known coding devices is the fact that the coding mechanisms and the means for manipulation thereof are on a single face of the device. This requires visual reading and setting from one side only of the conveyor.

Thus, there is a need in the conveyor art today for a coding and code reading system which is both relatively simple and inexpensive to manufacture and operate while at the same time permitting a relatively high number of distinct coding functions. Of equal importance, there is a need for such a system which will not suffer degradation in performance during operation in a typical industrial atmosphere.

SUMMARY OF THE INVENTION

Briefly, this invention provides a logic card means movable with an article or load carrier on a conveyor. The card is adapted for passage through one or more stations which read the card means to initiate a dispatch function if there is a preselected compatibility between the card and reading station arrangement. The logic card includes one or more slots having one or more block means slideable in each slot. The overall combined length of the blocks is less than that of the slot to provide means defining a movable opening in each slot. The opening in each slot permits the selection of a code which, when matched with the arrangement of the reading station, permits the projection of one or more light beams through said openings for receipt by one or more light sensors. A particular pattern of receipt and/or non-receipt is utilized to inhibit or initiate a dispatch function.

In a more narrow aspect of the invention, the reading station includes a plurality of individual highly intensified light beam generators which project beams of light across the path of the logic card toward a like plurality of individual light sensor means. The generators and sensor means are arrangeable to preselect a wide variety of codes which are compatible with preselected openings on the logic cards to initiate a dispatch function.

In another aspect of the invention the card includes one or more stationary openings and one or more blockage locations which cooperate with fixed light beam generators and sensors to key or arm the reading station when the logic card is in a "read now" position to eliminate false readings.

The card means preferably comprises three parallel spaced coextensive slots with nine blocks movable in each slot permitting the selection of each opening in ten positions. In this fashion, up to 1,000 distinctive code settings are available. In addition, group or series reading capability is provided depending on the number and arrangement of the light beam sensors and generators.

A significant advantage of the invention lies in the elimination of incorrect reading of the logic card during normal operation in a typical industrial atmosphere. The projection of an intensified light beam through a properly sized opening for receipt by an aligned sensor will not be affected by normal sway or vibration as is the case in present systems. By utilizing a highly collimated light beam, the sensor sensitivity can be set to avoid false readings from ambient or stray light sources. In other words the accuracy of the system is not dependent on a physical touching or "optical touching" of the logic card. This eliminates the need for special guidance equipment at the reading station.

Another significant advantage of this invention is the relative simplicity with which both the logic card code and reading station arrangements can be changed. Preferably, the block means or card includes written or digital indicia on both faces to permit an operator to quickly read the code visually and/or change it from either side. The light beam generators and sensors are preferably receivable in cell-like panels to permit quick and facile insertion or removal of the generators and sensors from the cells. The card is preferably comprised of a generally rigid plastic such as a thermosetting plastic which is inexpensively mass-produced. Thus, in its simplest form, the apparatus which is the subject of this invention utilizes components which, except for the logic card, are stationary and do not require intermittent physical contact. This provides an extremely economically feasible apparatus with a long service-life requiring little or no maintenance.

DESCRIPTION OF THE PREFERRED EMBODIMENT

Figure 1:
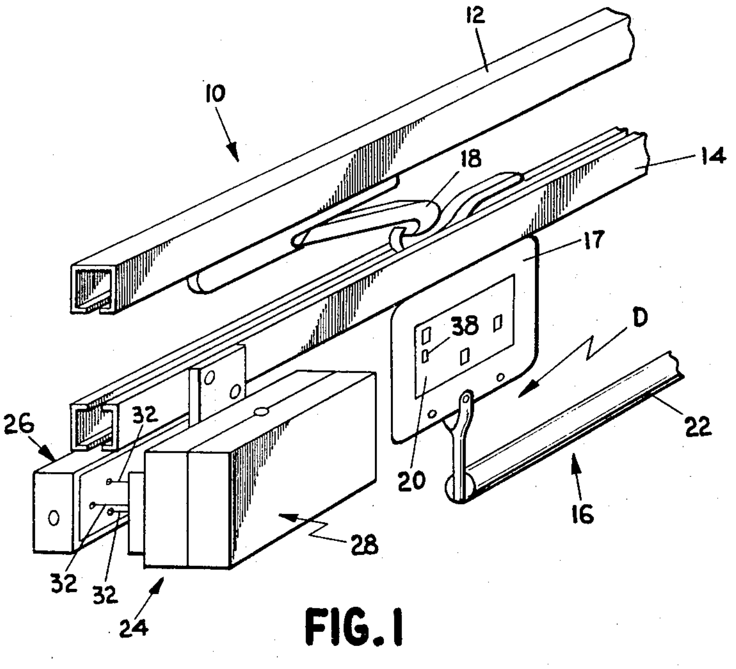
FIG. 1 is a fragmentary view in perspective of a power and free conveyor illustrating the reading station provided by the invention suspended from the carrier track with the logic card provided by the invention mounted on a carrier about to move through the reading station.

Referring now to the drawings, and particularly to FIG. 1, a typical overhead conveyor designated generally by the reference numeral 10 is shown having an upper track 12 and lower track 14. This type of conveyor is generally known as a power and free conveyor in that a drive chain (not shown) is constantly moved through upper track 12 while a load carrier 16 is suspended for movement along the lower track by appropriate trolleys (not shown). A puller or pusher 18 is mounted to the drive chain and is selectively engageable with a load carrier trolley on the free track to move it along the lower track. Generally, the conveyor system will include secondary and spur tracks which may or may not be powered.

The reference in the following description to a power and free conveyor system as shown in FIG. 1 is for convenience only and is not intended to be interpreted as a limitation on the invention described herein. The concepts of the invention apply equally to many other types of conveyors. The various possible conveyor performance characteristics such as accumulation, switching etc. are numerous and need not be explained for the purpose of this invention. It is sufficient to state that generally, these various operational characteristics are referred to herein as dispatch functions. Thus, the opening or closing of a switch to divert a load carrier from one track to another is referred to as a dispatch function. The mere classification or counting of a particular load supported on a carrier is likewise referred to as a dispatch function.

Referring yet to FIG. 1, a logic card 20 is shown to be held and supported on a portion of carrier 16 for joint movement along the lower track with carrier 16. Depending on the type of conveyor utilized, the card may be mounted by some type of bracket directly on the article being conveyed. In a power and free system however, the load (not shown) is generally suspended as shown in FIG. 1 from a load bar 22 interconnected to a front and rear trolley (not shown). The logic card is removably received in a holder bracket 17 such that the card-bracket combination is movable with a particular article being conveyed.

A reading station 24 is suspended beneath the carrier track at a location whereat it is desired to read the passing cards and, where predetermined information is read, to initiate the performance of a dispatch function. One such location might be immediately prior to a switch wherein certain coded carriers are to be diverted. Station 24 includes a light source generator facility 26 and a light receiving or sensing facility 28.

Figures 4, 5, 6, 7, 8:
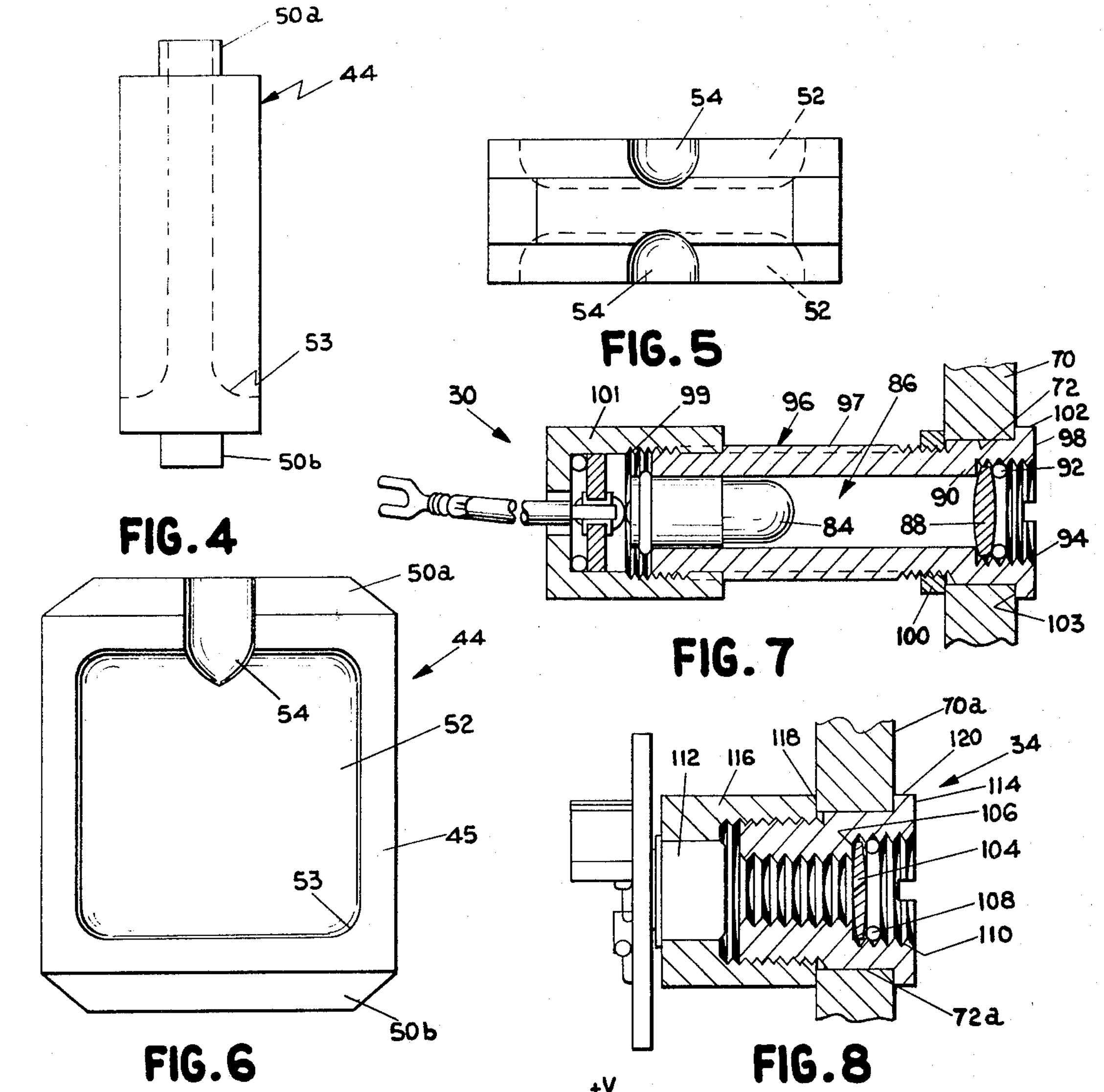
FIG. 4 is an end view of one of the digital blocks provided by the invention.
FIG. 5 is a top view of the block illustrated in FIG. 4.
FIG. 6 is a side elevational view of the block illustrated in FIGS. 4 and 5.
FIG. 7 is a fragmentary cross-sectional view of a light beam generator utilized in the invention.
FIG. 8 is a fragmentary cross-sectional view of a light beam sensor utilized by the invention.

The generator facility 26 includes a plurality of individual light beam generators 30 such as shown in FIG. 7 which project a highly intensified beam of light 32 (FIG. 1) laterally across the path of logic card 20 as it moves through station 24. The sensing facility 28 includes a like plurality of light sensing cells 34 (FIG. 8) aligned opposite generators 30 on the other side of the logic card path. Thus, unless obstructed, each light beam is received by a corresponding cell 34 and a dispatch function initiated. The details and operation of generators 30 and cells 34 will be described more fully hereinafter.

Logic card 20 (FIGS. 1 and 2) has four openings therethrough, namely openings 38, 40*a*, 40*b* and 40*c*. Depending on the physical arrangements of openings 40*a*, 40*b* and 40*c* these openings may be aligned with light beams 32 when the card is in the reading station and a reading is taken so that each of light beams 32 will be receivable by a sensor 34. When this happens, a dispatch function will be initiated such as the actuation of a switch to divert the carrier. If such alignment does not occur, the particular carrier will not be diverted since the switch will not be moved. On the other hand, if the sensors are not in receipt of the light beams during a reading period, this can be utilized also to initiate a dispatch function such as the closing of a switch so that the carrier will not divert.

Figure 2:
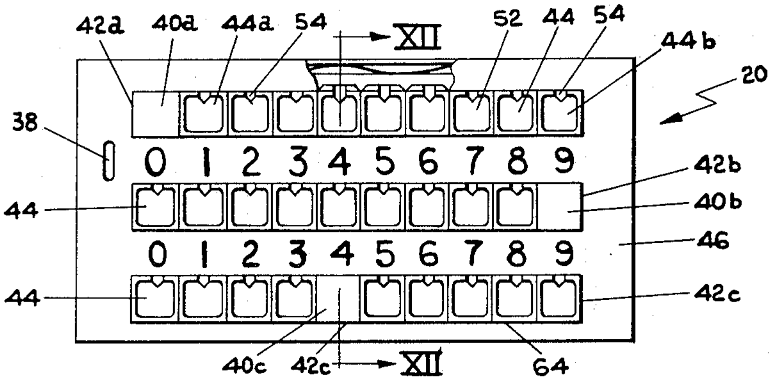
FIG. 2 is a front elevation view, partially cut away, of the logic card provided by the invention.
Figure 3:
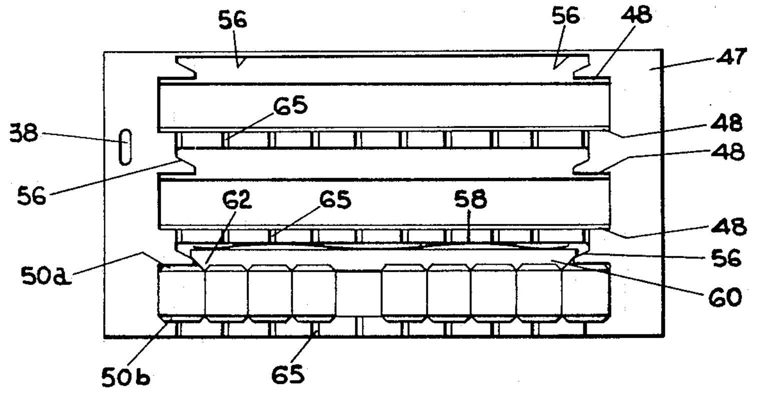
FIG. 3 is a view similar to FIG. 2 with the front face of the logic card removed to illustrate the way in which the digital blocks are retained in the card slots.
Figure 12:
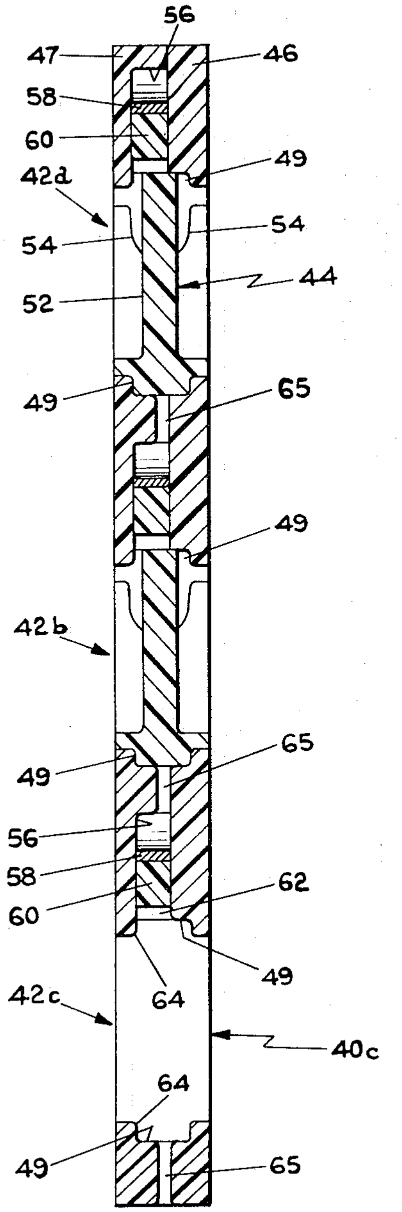
FIG. 12 is a cross-sectional view of the logic card illustrated in FIG. 2 taken along plane XII—XII.

An important aspect of the invention is found in the overall simplicity and yet extreme flexibility of logic card 20. Referring to FIGS. 2, 3 and 12, card 20 is shown having an overall rectangular configuration elongated in the direction of movement of the carrier. Each card includes three elongated slots 42*a*, 42*b* and 42*c*. The elongation of each slot is also in the direction of movement of the carrier. The slots are preferably spaced vertically from each other in a parallel and coextensive relationship. Also, the spacing of the slots corresponds generally to their height. Mounted within each slot for slideable movement therealong are nine identical digital blocks 44 (FIGS. 4–6) having a generally rectangular configuration. The height of the main body 45 of each block corresponds dimensionally to that of each slot. The combined length of the nine blocks is less than the overall length of each slot by an amount generally equal to the length of one block. In this fashion, the nine blocks are movable in a fore or aft direction so that an opening 40*a*, 40*b* and 40*c* is provided in each slot 42*a*, 42*b* and 42*c*, respectively, each opening being selected to be in one of 10 possible positions, the dimensions of each opening corresponding generally to the length and height of an individual block. In effect, the opening in each slot is movable to one of 10 positions and it will be readily appreciated that logic card 20 illustrated in FIG. 2 can be quickly set to represent any one of 1,000 different and distinctive codes. It will be appreciated, that less than nine blocks could be used to provide more than one movable opening in each slot to increase the number of possible codes. It has been found that where the dimensions of openings 40 are approximately 0.625 inches square, an error free signal can be provided under normal sway and vibratory conditions as will be illustrated later to eliminate additional mechanical guidance mechanisms at the reading stations.

An additional opening 38 is provided in card 20 offset vertically from slots **42*a*, 42*b* and 42*c*. Opening 38 is substantially narrower in width than opening 40*a*, 40*b* and 40*c* and is elongated in a vertical direction relative to its width. Preferably, the height of opening 38 is less than that of openings 40 for reliability as will be described hereinafter. Opening 38 acts as a light operating key or arming device to prevent false sensing of codes at the reader station. Opening 38 is referred to as a light operating key or arming device since a reading by reading station 24 will not occur and hence a dispatch function will not be initiated, unless a key light generator and sensor aligned with opening 38 are in communication with each other. In order to prevent a false reading from occurring when logic card 20 is not in reading station 24**, a dark operating key is also provided which inhibits the reading sensors from operating unless a particular light beam generator and sensor are obstructed from communicating from each other. The keying function is provided by assuring that a reading will not occur unless a first light beam is received by a particular sensor and a second light beam is not received by a particular sensor. Thus, a simultaneously light and dark reading of the key generator and sensors is required in order to initiate a reading of the logic card in the reading station. The exact operation of the keying function which prevents false readings will be described in more detail hereinafter.

Logic card 20 (FIG. 12) is preferably comprised of a pair of mating plates designated as front plate 46 (FIG. 2) and rear plate 47 (FIG. 3).

The upper and lower edges of each slot 42 include a recess 48 (FIG. 3) open to the interior of each plate. When the plates are mated together to form a single card, recesses 48 form a channel 49 (FIG. 12) in the upper and lower edges of each slot extending the entire length of each slot. Each digital block 44 (FIG. 4) includes an upper and lower projection **50*a* and 50*b* receivable in channels 49 formed by recess 48 to secure blocks 44** within the slots in addition to providing a guide track for their longitudinal movement in the slot.

In order to facilitate the longitudinal movement of each block 44 in the slot, the central portion 52 on each side face of the block is recessed. Recess 52 permits positive fingertip control to move each block. The corners 53 are rounded to facil-itate indexing of the fingertip in the recess. To set or reset the digital location of each block 44, one simply moves the blocks from side to side. A downwardly extending indent 54 is positioned at the center of each block and communicates with recess portion 52. This facilitates drainage in those instances where the card is washed. This occurs in institutions such as hospitals where the elimination of bacteria collection is important In this regard, the rounded corners 53 also facilitate complete drainage to avoid the collection of dirt etc..

It will be appreciated that due to the dimensions of the slot and each block, each individual block is positionable in but two digital locations. For example, referring to FIG. 2, digital block **44*a* is positionable as shown in the number 1 digital position or it is movable to the left in the zero digital position. It is possible to simultaneously move the entire group of blocks in an individual slot for example by moving digital block 44*b* shown in FIG. 2** to push the entire line of blocks to the left.

It is important in order to maintain sufficient reliability in the entire system that the digit blocks are not unintentionally moved from their set position. Unless some means is provided to retain the digital blocks in their respective preselected position, the normal vibration present in a typical industrial installation could cause the blocks to move in one direction or the other over a period of time.

Referring to FIGS. 3 and 12, the upper recess 48 of each slot formed in rear plate 47 includes an enlarged recess 56 for receipt of a spring 58 and detent bar 60. Detent bar 60 is urged by spring 58 into abutment against the upper projections **50*a* of digital blocks 44. The lower edge of detent bar 60 includes a plurality of longitudinally spaced sawtooth projections 62, the spacing between teeth corresponding to the length of the digital blocks 44. Projections 50*a* (FIG. 6) are sloped at each end in accordance with the slope of teeth 62 so that in effect, when a digital block is properly positioned at a particular digital position, upper projection 50*a* is captured between two spaced teeth 62. The urgency of detent bar 60 by spring 58 is sufficient to maintain the digital blocks 44 in their respective positions to overcome any normal vibration. On the other hand when it is desired to reset a particular block the detent bar is cammed upwards by projection 50*a* when the block is moved in a longitudinal direction. Upon resetting a particular digital block, the urgency of spring 58 will cause detent bar 60 to snap back into capturing engagement with the digital block in the slot. Preferably, the corners 64 of the upper and lower edges of each slot (FIG. 12**) are rounded to reduce the amount of frictional engagement between the digital blocks and slot edges to facilitate their sliding movement.

The front and rear plates 46 and 47 are preferably comprised of a thermosetting resin such as Bakelite and are joined together by an appropriate adhesive or other fastening means. With the digital blocks 44, detent bars 60 and springs 58 properly inserted in the slots and recesses, the plates are joined together to form a unitary logic card. Preferably, digital indicia is applied to each face of the card in the spaces intermediate each slot. This provides a quick visual reading of the code set on the card from each side so that it can be read, set or reset from either side. A thermosetting resin such as Bakelite provides an extremely long useful service-life for the card.

A material such as Bakelite also can be cleaned easily. For example in institutions such as hospitals, the cards are washed regularly. To prevent unsanitary collection spots, a plurality of longitudinally spaced drainage grooves 65 (FIGS. 3 and 12) are formed in the rear plate to avoid water collection.

Figure 11:
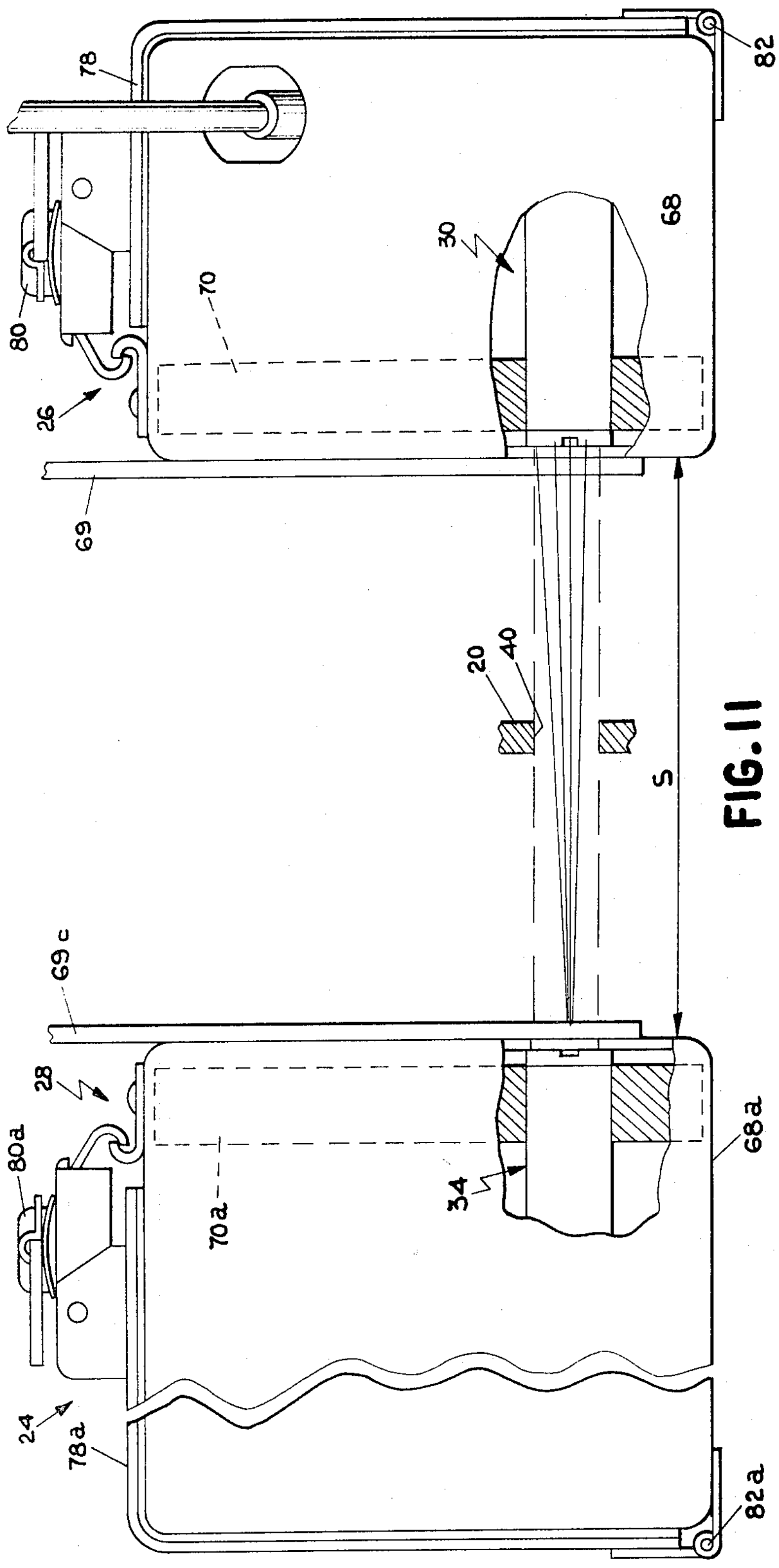
FIG. 11 is a fragmentary side elevation view in cross section of the light source and sensor arrangement of the reading station provided by the invention.

Referring now to FIGS. 1 and 11, reading station 24 as noted earlier comprises a light generator facility 26 and a light sensing facility 28. Facility 26 includes a container 68 suspended by a mounting bracket 69 to the carrier track. The face of the container which faces the sensing facility 28 is closed by a face plate 70 (FIG.

10) which includes a plurality of openings 72 for receipt of the light beam generators 30. Face plate 70 includes three vertically spaced rows of openings 72, each row having 10 openings corresponding to the alignment of slots 42 and digital blocks 44 of logic card 20. In addition, face plate 70 includes an opening 74 for receipt of a light beam generator 30 which is capable of projecting a light beam through opening 38 on logic card 20. Another opening 76 receives a light beam generator which is positioned such that the light generated thereby is not receivable by a light sensor during the time that a logic card 20 is passing through the reading station. The light generators mounted in openings 74 and 76 are provided to key the reading station to prevent a false reading, the function of which will be described hereinafter.

A cover plate 78 (FIG. 11) covers the upper and rear sides of container 68 and is detachably secured by a fastener 80 to the front portion of container 68. Cover plate 78 is hinged at 82 to the under side of container 68 so that when the fastener is released, the cover plate is rotatable in a clock-wise direction. (FIG. 11) to expose the upper and rear sides of the container. This provides a quick means of obtaining access to the container in order to reset the particular locations of the light beam generators 30 in face plate 70. Container 68 also encloses and seals the appropriate electrical circuitry necessary to provide power to the light beam generator.

The light sensing facility 28 is similar to light generator facility 26 in that it includes a container *68a*, mounting bracket *69a*, cover plate *78a* and fastener *80a*. When fastener *80a* is released, cover plate *78a* is rotatable in a counter-clock-wise direction (FIG. 11) about hinge *82a* to expose the upper and rear sides of container *68a*. The front face of container *68a* is also closed by a face plate *70a* identical in layout to plate 70. That is, plate *70a* is the mirror-image of plate 70. The suffix "*a*" will be utilized to distinguish the plate mounted in container *68a* from that mounted in container 68. Plate *70a* is not shown in detail due to its overall identity to plate 70. Face plate *70a* includes a like number of openings *72a* arranged in spaced rows for receiving and holding light sensors 34. Openings *74a* and *76a* likewise hold sensors aligned with the light beam generators mounted in openings 74 and 76 of plate 70. Containers *68a* has a greater depth than container 68 since it is utilized to house logic and power supplies (not shown) in addition to the sensors and electrical circuitry associated therewith.

Referring now to FIGS. 7 and 8, a light beam generator 30 and sensor 34 is shown. In an industrial environment, reiliability and maintenance are important aspects. Preferably, integrated circuit sensors are utilized with solid state circuitry throughout. A modular construction is likewise preferred wherein the power supply, logic printed circuit board, light sources, light sensors and output relays are all plug-in components. No special adjustment techniques are required to align the light sources with the sensors. Adjustments required can be restricted to simple rotational movements. In accordance with the invention, the adjustments required are secured so that they are impervious to shock and vibration etc. of normal operation.

Essentially, regardless of the type of light beam generator used, a highly intensified or collimated beam is desired. By utilizing a highly intensified beam of light, the threshold sensitivity of the sensor can be set so that it is responsive to an intense beam of light and therefore will not render false readings resulting from the entrance of ambient or stray light. A preferred lamp is a General Electric 328 having a tungsten filiment which provides over twenty-five thousand hours of service life. This bulb typically will provide two shift operation for a period of six years or twenty-four hour continuous operation for three years. It includes an incandescent lamp 84 which projects a mass of light down a tube 86. At the opposite end of the tube is a doublet lens 88 which seats against the shoulder 90 and is held in place by an O-ring 92 frictionally engageable with threads 94. This permits easy replacement or changing of the lens by simply removing the O-ring. Referring to FIG. 11, lens 88 causes the light beams to be intensified when projected toward a sensor 34. The focal point of lens 88 is selected in relation to the spacing between generator 30 and sensor 34. In the preferred embodiment, the spacing S (FIG. 11) between facilities 26 and 28 is 4.0 inches.

As illustrated in FIG. 11, when logic card 20 is in perfect alignment vertically and horizontally, the cross section of light beam 32 in an opening 40 strikes well within the peripheral limits of the opening which as noted earlier is approximately 0.625 inches square. Acceptable limits for a typical industrial operation are plus and minus three degrees of tilt of the logic card in the longitudinal axis and lateral swaying of plus or minus 12°. While passing through the reader, vertical height variation of the trolley on which the logic card is mounted is preferably maintained between a plus and minus 0.125 inches. Within these limits, complete reliability is assured. All of these limits are well within the skill of the present art and hence an important advantage gained by this invention is the elimination of any requirement for extraordinary mechanical guidance.

The light generator 30 (FIG. 7) has a cylindrical body portion 96 which is sized to fit through openings 72. The outer wall 97 is threaded from near the front end 98 to the rear end 99 to receive a lock nut 100 and end cap 101 threadably engaged therewith. End cap 101 is provided to connect the appropriate electrical circuitry and power source to lamp 84. A flange 102 is formed on the front end 98. Flange 102 has a diameter greater than openings 72 to form a shoulder 103 which abuts against the outer surface of face plate 70. With lock nut 100 and end cap 101 removed, body portion 96 is inserted through an opening until flange 102 is in abutment with the front face of plate 70. Lock nut 100 is then threaded onto body 96 until plate 70 is clamped firmly between nut 96 and flange 102 to secure the generator 30 to the face plate. The end cap 101 is then threaded onto body portion 96 to connect up the power supply to the lamp.

It will be realized that other forms of mounting can be utilized. For example the relative positions of lock nut 100 and flange 102 could be reversed with the outer end 98 including threads to reverse the clamping arrangement. This would not require the removal of cap 101 every time the lamp position was changed.

Referring to FIG. 8, light sensor 34 includes a focusing lens 104 positioned against a shoulder 106 held in place by an O-ring 108 wedge fitted between threads 110 similar to that described with regard to light generator 30. Lens 104 focuses the intensified light beam received from a generator 30 and projects it on a photodetector board assembly 112 which receives the light beam and through conventional means provides an electrical output.

The body of sensor 34 includes a male portion 114 and female portion 116. The outer end or portion 116 faces the light beam generator and forms a shoulder 118. A shoulder 120 is formed on male portion 114, the latter being threadable within female portion 116. Sensor 34 is mounted to face plate 72 by inserting portion 114 through an opening 72a for threaded engagement with female portion 116. When tightened, shoulders 118 and 120 anchor the sensor to the face plate. To insert or reset the location of any particular sensor within container **68*a* (FIG. 11) fastener 88 is released to permit cover 78*a* to be pivoted about hinge 82*a* thereby permitting free access from the front, top or rear of container 68*a*.** The leads provided from each sensor are sufficiently long so that the wiring need not be changed even though the location of a particular sensor is changed.

Figure 9:
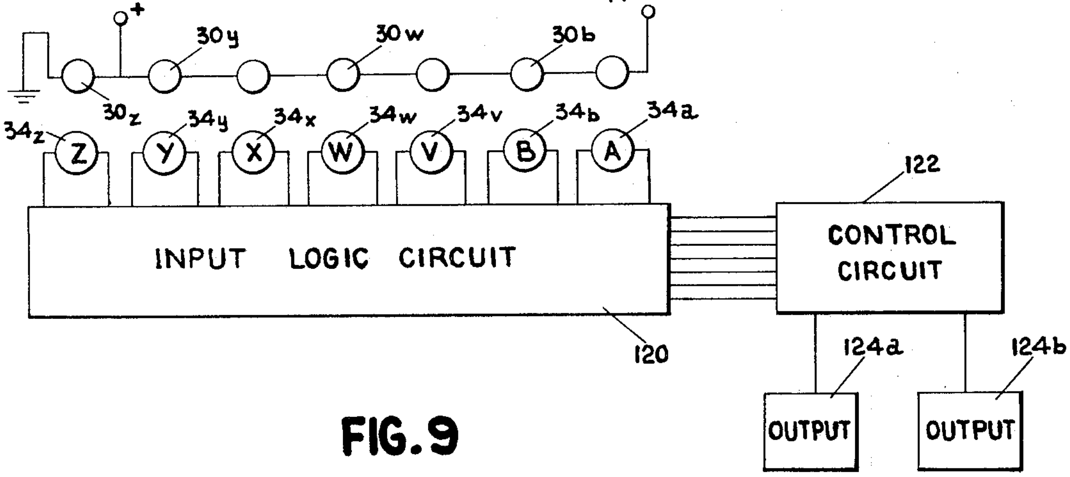
FIG. 9 is a schematic diagram of the reading station provided by the invention.
Figure 10:
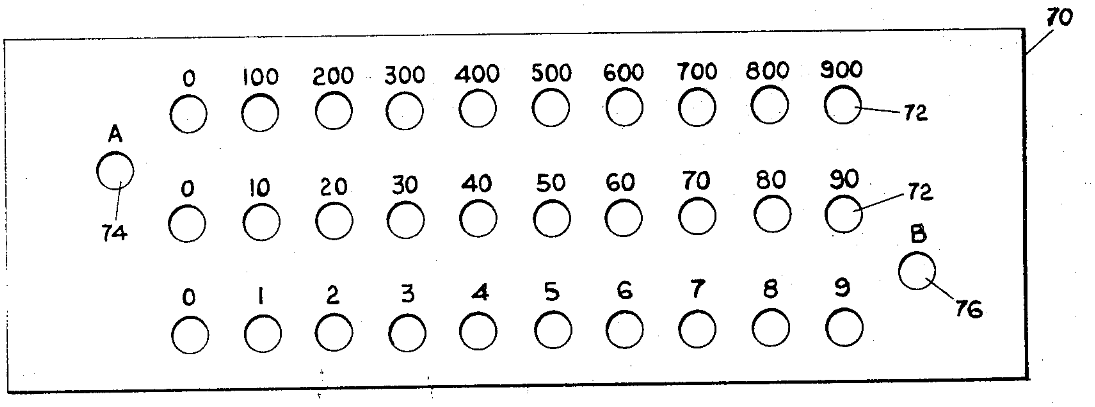
FIG. 10 illustrates the code location chart for the logic card and reading station provided by the invention.

Referring to FIG. 9, a schematic is shown illustrating one type of optical arrangement. A seven bit system is utilized in order to permit adaptation to a conventional binary computer and logic system. This permits the usage of seven individual light beam generators and sensors as shown in FIG. 9.

Two of the seven light beam generators designated **30*a* and 30*b* and two of the sensors 34*a* and 34*b* are fixed in the reader station to perform the "key" function to prevent false readings. These are referred to hereinafter as keys A and B. Likewise, generators 30*v*, 30*w*, 30*x*, 30*y*, 30*z* and sensors 34*v*, 34w, 34x, 34y, 34z respectfully are referred to as signals V, W, X, Y and Z. The keying function has been referred to previously and will now be described in detail. It is important of course that a reading occur only when a particular logic card 20 is in correct position within the reading station to prevent unintentional dispatch functions from being performed. Only when a comparision is detected at the reader with a logic card in proper position, will the logic circuit 120 set a control circuit 122 for instigating an output 124*a* or 124*b*.**

Referring to FIG. 2, logic card 20 is arranged with a key opening 38 having a unique location vertically relative to slots **42*a*, 42*b*, and 42*c*. Preferably opening 38 has a width that is approximately one-quarter the normal code opening width represented by openings 40*a*, 40*b*, and 40*c*. By reducing the opening width, a reading of the logic card as it passes through the reading station io permitted only at a precise position. Thus, the reduced width of opening 38 increases the accuracy of this key function. The height of opening 38 is preferably less than the code openings to guard against false readings due to possible tilting of the logic card. Referring to FIG. 9, for purposes of illustration, light generator 30*a* and light sensor 34*a* are aligned with each other in reading station 24 opposite the level of opening 38. In this fashion, receipt by sensor 34*a* of the light beam generated by generator 30*a* will occur when logic card 20 is in the reading station only when opening 38 is aligned with generator 30*a* and sensor 34*a*. Unless there is communication in this regard, a reading is prevented. This particular key is referred to as the A key and is a light operated key in that it requires receipt of the light in order to permit a signal reading. In all other instances, a reading and output is inhibited. It will be appreciated however that key A will also be light when a logic card is not in the reading station. This necessitates a dark key which inhibits a reading unless a particular generator and sensor are not in communication with each other. This is illustrated by generator 30*b* and light sensor 34*b* (FIG. 9). Generator 30*b* and 34*b* are preferably arranged uniquely vertically relative to slots 42 and opening 38. Since opening 38 lies in between slots 42*a* and 42*b* generator 30*b* and sensor 34 are arranged to transmit on a level intermediate slots 42*b* and 42*c*. It will be appreciated that when logic card 20 is in the reading station, a dark signal is set at key B since the card will obstruct communication between generator 30*b* and sensor 34*b*.** In all other cases, communication exists and a signal reading function is inhibited.

Certain types of conveyor equipment may incorporate article carrying and/or support apparatus which passes through the reading station. Such apparatus may be physically dimensioned in some situations, so as to be capable of interrupting communication between generator **30*b* and sensor 34*b* during such passage without simultaneously interrupting communication of the light key and code generators and sensors. The logic circuit illustrated in FIG. 13** can be utilized to prevent an undesired dispatch function in this situation.

Figure 13:
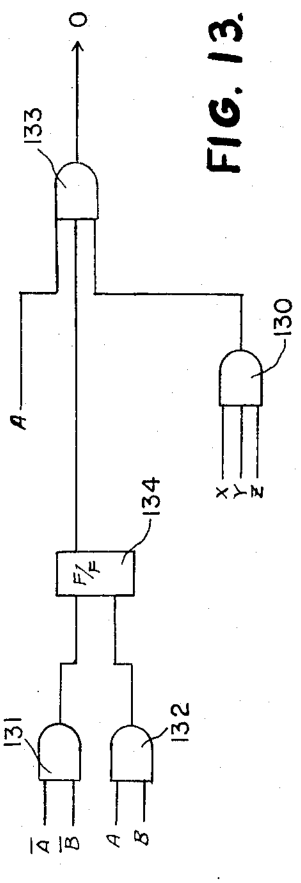
FIG. 13 is a schematic diagram of the enabling circuit of the invention.

The logic circuit illustrated in FIG. 13, more particularly, includes logic gates 130–133 and memory or flip-flop 134. The light key output A and the dark key output B form the inputs to gate 132 which generates an output in response to the presence of both signals (condition "A B"). An output is generated at gate 131 in response to the absence of both signals (condition "$\bar{A}$ $\bar{B}$"). An output from gate 132 turns flip-flop 134 off. An output from gate 131 turns flip-flop 134 on.

The signal outputs X, Y and Z form the inputs to AND gate 130, the output of which is routed to AND gate 133. Signal A and the output from flip-flop 134 are the other inputs to AND gate 133.

The condition "$\bar{A}$ $\bar{B}$" is realized only when the card 20 is moving through the reading station, the card 20 being of sufficient length relative to the longitudinal spacing between sensors **34*a* and 34*b* to block both sensors prior to aperture 38 aligning itself with sensor 34*a*. This blocking generates condition "$\bar{A}$ $\bar{B}$" causing an output from gate 131 and turning flip-flop 134 on. When opening 38 passes into alignment with sensor 34*a*, condition A will be realized. At that instant if outputs X, Y and Z are present — i.e., the code openings correspond to the position of the code sensors — three inputs will be generated at AND gate 133 and a dispatch output O generated. Complete passage of the card 20 through the reading station will generate condition "A B" causing flip-flop 134** to be reset to its "off" condition.

Referring now to FIG. 1, with card 20 moving in the direction of arrow "D," and the logic card out of the reading station, keys A and B are light therefore inhibiting a reading and maintaining flip-flop 134 in its "off" condition. In the embodiment shown, generator **30*a* and sensor 34*a* are upstream of generator 30*b* and sensor 34*b*. As the card enters the station, key A goes dark to inhibit a reading even though the dark key may subsequently go dark. As the card progresses through the station key B goes dark (condition $\bar{A}$ $\bar{B}$) turning flip-flop 134 "on." When opening 38 passes intermediate generator 30*a* and sensor 34*a*** there is a simultaneous light and dark key resulting in the enablement or arming of the code reading circuitry to effect a reading.

This sequence of key operation is necessary to perform the read operation. In the overhead power and free type of installation, illustrated herein, the rate of movement of the trolleys generally will be between one to 600 feet per minute. The rate of reading provided by the invention will accommodate easily carriers or articles moving at the speeds mentioned. A reading is inhibited in all instances unless the logic card is in a particular position in the reading station, assuring the elimination of false readings.

Since two of the light beam generators and sensors are utilized to perform the keying function, five generators and sensors remain for use in code reading. The specific code to be sensed is established by positioning the light generators and sensors opposite each other at the lateral location representing the number desired for each digital opening on logic card 20. Referring to FIG. 2, the code set on the particular logic card shown is zero in slot 42*a;* nine in slot 42*b;* and four in slot 42*c*. The code described relative to FIG. 2 would read as code 094 with slot 42*a* representing the hundred (zero); slot 42*b* representing the tens (90); and slot 42*c* representing the units (four). Hence, any code can be quickly selected between 000–999.

As a single code reader, only three light sources and sensors are required. For example, in order to sense the specific code illustrated in FIG. 2, three light sources and generators designated with reference to FIG. 9 as X, Y and Z are arranged on the face plates 70 and 70*a* in the openings corresponding to code 094. When a logic card such as that illustrated in FIG. 2 passes through this reading station, at the instant that a reading is keyed, simultaneous communication between the light beam sources and sensors of signals X, Y and Z will occur. Then and only then will an output function be actuated through the operation of input logic circuit 120 and control circuit 122. This output could of course be directed to a dispatch function such as diverting the particular trolley in question by actuating a switch or simply introducing a particular informational reference into a computer for classification purposes.

In the preferred embodiment, the provision of five signal generators and sensors permits a single reading station to perform a single code reading function with two optional codes. In other words, the single code reader with the optional code has the capability of recognizing two different codes when so directed. The sequence of this reader is identical to that of the single code reader. A selector switch (not shown) may be provided for selecting which code is to be recognized. The system however can be designed without the selector switch. For one example, with signals X, Y and Z arranged to read the 094 code illustrated FIG. 2, signals V and W (FIG. 9) can be set for example in the digital location on face plate 70 and 70*b* corresponding to the numbers 200 and 30. With a proper selector switch, these five numbers set in a particular reading station could be selected to recognize the following codes: 234; 294; 094; and 034. In other words, four individual single code readings can be selected. Obviously, the permutations and modifications of the number and location of light source generators and sensors is practically endless.

The reading station can also be utilized to perform a group code reading function. The group reader operates using the same principles as the single code reader. The group reader has the capability of recognizing more than one particular code. If the reader is set to recognize a group of 10 different codes, it only looks at the hundreds and tens digits. The units digits are disregarded. For larger groups of codes, the reader will recognize more than one particular tens or hundreds digit. The criterion for recognizing larger groups of codes is that more light sources and sensors and logic may be needed.

The apparatus provided by the invention is also functional as a remote serial reader. The serial reader has the capability of reading all codes. In this particular application the code read is compared with the code set on remote selector switches (not shown) and an output produced only when a comparision is made.

The operation as a serial code reader is somewhat different than that of the operation of a single code reader. The logic cards containing the codes are the same cards used for the single card reader as shown and illustrated in the drawings. The serial code reader however utilizes additional openings or reference locations (not shown) on the logic cards. These locations are relative to each code position and are designated as clock positions. The serial reader reads the code as the card travels through the reader head. As the card proceeds through the reader, the clock positions are used to synchronize the code holes. Retro-reflective marks or additional openings may be utilized to perform the clock function.

A typical sequence of operation is as follows. The logic card enters the reading station and key A goes dark. When key A goes dark for the first time, it indicates to the reader that a card is to be read. The code is read and when the key goes light and then dark a second time, the reading operation is complete. With appropriate equipment, the readers stores the code and compares the code with the data set on the remote selector switches. If a comparison is made, an output signal is provided. When the dark operated key becomes light, the reader is reset and the output data maintained until the next card proceeds through the reader.

Depending on the logic system arrangement and number of light sensors and generators utilized, a variety of additional performance criteria are available. For example, an override may be provided wherein a carrier is coded for diversion onto a spur track, but that particular spur track is loaded to capacity. The override will preempt the output signal to prevent the switch from being actuated. Yet another capability is that of identification of the carrier by consecutive numbers, used in conjunction with single or all code readers. A memory circuit is provided so that as the code reader indicates the presence of a particular code, it is introduced to the memory circuit which either initiates or does not initiate an output through the logic circuit depending on the input to the memory circuit.

The foregoing descriptions of the reader and various functions is provided only to illustrate the wide variety of modifications which can be made in a particular system in accordance with the teachings of this invention. A detailed description is not necessary since the obvious modifications to one skilled in this art are many and varied and yet do not depart from the invention itself.

Since power failures do occur, memory capability is of some concern in a fully automated system. In the preferred embodiment, through the utilization of latching relays and appropriate logic, the dispatch function is designed to remain in the pre-power state when power is restored. Thus positive dispatch is always provided and no information will be lost resulting in subsequent dispatch error.

For example, when a carrier arrives at a reading station, if a code compliance is established, a dispatch function such as the actuation of a switch will be initiated. After the carrier goes through the switch, the switch will stay in its diverted position. If the next carrier passing through the reading station is also to be diverted, the output to the logic will be given but no action will happen since the switch is already in its diverted position. Consequently, the carrier to be diverted will likewise follow the preceding carrier. If the next code however is not for this lane, the opposite output will be given by the logic and the switch will straighten. Again, if the fourth carrier moving through the reading station is not to be diverted, the straight output will be given but no action will happen since the switch is in its proper orientation. This greatly reduces the overall number of operations of the various dispatch functions such as the switches and is a definite improvement over the solenoid or cylinder operated spring return approach presently known. This type of system obviously greatly increases the service life of the overall system in its entirety.

In summary, a reading station is mounted to a conveyor track and utilizes a plurality of light sources which project an intensified light beam laterally across for receipt by a like plurality of light sensing units. The light generators are arranged in a code so that when there is complete compliance by the generators with the senors when a logic card is positioned in that reading station, a dispatch function output is registered. The logic card provided by the invention is mounted on an article or carrier movable along the conveyor for movement through one or more reading stations. The logic card includes movable openings which openings are arrangeable in compliance with a preselected code. Since there is no mechanical interfacing or rebounding of light rays, the need for mechanical guidance structure at the reading station is eliminated. At the same time the tolerance of the system is increased significantly.

Although but one embodiment with minor modifications has been shown and described in detail, it will be obvious to those having ordinary skill in this art that the details of construction of this particular embodiment may be modified in a great many ways without departing from the unique concepts presented. It is therefore intended that the invention is limited only by the scope of the appended claims rather than by particular details of construction shown, except as specifically stated in the claims.

The embodiments of the invention in which an exclusive property of privilege is claimed are defined as follows:

1. An apparatus for initiating a dispatch function of an article moveable along a conveyor comprising in combination: a logic card; a reading station operatively associated with said conveyor, said station comprising one or more light generating means on one side of said conveyor and one or more light sensing means on the other side of said conveyor, each light sensing means being aligned with a light generating means, said logic card traveling with an article along said conveyor through said reading station intermediate said light generating means and light sensing means to block light communication between said light generating and light sensing means, said logic card including means defining one or more openings moveable selectively with respect to said logic card to permit receipt by said light sensing means of the light generated by said light generating means under predetermined conditions to initiate the performance of a selected dispatch function; and actuating means operatively associated with said reading station to perform said dispatch function.

2. An apparatus according to claim 1 wherein said light generating means includes a plurality of individual highly intensified light beam generators which project generally parallel beams of light, said light sensing means including a plurality of individual photo-optical receiving means aligned with said generator for receipt of said light beams so that when said logic card is positioned in said reading station intermediate said light generating means and light sensing means, a preselected pattern of light receipt by said light sensing means will initiate the operation of said actuating means.

3. An apparatus according to claim 2 wherein said individual light beam generators and photo-optical receiving means are adjustable from either side of said conveyor to permit facile selection and changing of the preselected arrangement of the code selected on said logic card to which it is responsive to initiate said actuating means.

4. An apparatus according to claim 2 wherein said logic card is comprised of a generally thin plate means having at least one elongated slot therethrough, at least one block means slideable in said slot, said block when aligned between said light generating means and light sensing means preventing receipt of said light source means by said light sensing means, said slot being of sufficient length to exceed the combined lengths of said blocks so that means defining a moveable opening is provided along said slot at a preselected position to permit receipt of light from said light generating means by said light sensing means.

5. An apparatus according to claim 4 wherein said card in addition to said slot includes position responsive reader enabling means fixed on said plate and operable with said light generating means to indicate the proper positioning of said logic card in said reading station to prevent a false reading.

6. An apparatus according to claim 5 wherein said enabling means fixed on said plate includes a fixed opening alignable with one of said generating means, and a locus on said logic card wherein light from a second unit of said generating means is not receivable by a corresponding light sensing means when said fixed opening is aligned with said one generating means, said reading station being inhibited from initiating said actuating means until said fixed opening is aligned with said one of said generating means and said locus is likewise aligned with said second generating means.

7. A logic card for use in a photo-optical conveyor code reading apparatus having a reading station including a light generating means on one side of the conveyor and light sensing means on the other side of the conveyor comprising plate means having at least one elongated slot extending therealong, at least one block means slideable in said slot, said block means when aligned between said light generating means and light sensor means preventing receipt of light from said light generating means by said light sensing means, said slot being of sufficient length to exceed the combined lengths of said block means so that means defining a moveable opening relative to said card is provided along said slot at a preselected position to permit receipt of light from said light generating means by said light sensing means when said logic card is positioned intermediate said light generating and sensing means.

8. The logic card according to claim 7 wherein said plate means includes a plurality of vertically spaced, longitudinally extending slots, each slot including a plurality of blocks moveable in each slot, each of said blocks being limited in movement between first and second positions, and resilient detent means urging each of said blocks into one of said positions to retain said blocks in a preselected orientation.

9. The logic card according to claim 7 wherein said card in addition to said slot includes position responsive reader enabling means fixed on said plate means and operable with said light generating means to indicate the proper positioning of said logic card in said reading station to prevent a false reading.

10. The logic card according to claim 9 wherein said enabling means fixed on said plate means includes one or more openings fixed on said plate means and alignable with one of said light generating means to permit receipt of said light generating means by said light sensing means.

11. The logic card according to claim 10 wherein said enabling means fixed on said plate means also includes a locus point wherein the light from one of said generators is blocked from receipt by one of said sensors when said fixed opening is aligned with said one light generating means.

12. A card comprising means defining a moveable opening, said card having at least one elongated slot extending therealong; and a plurality of block means moveable along said slot, each of said block means being moveable only between a first and second position, the combined length of said block means being less than the length of said slot to define said opening, movement of said block means in said slot causing the position of said opening to change.

13. The card according to claim 12 wherein said card further includes resilient detent means releasably engageable with said blocks to retain each of said blocks in one of said positions against unintentional movements in said slot from a preselected position.

14. A card comprising means defining a moveable opening, said card having at least one elongated slot extending there-along; a plurality of block means moveable independently within said slot to provide a plurality of possible opening positions, the combined length of said block means being less than the length of said slot to define said opening, movement of said block means in said slot causing the position of said opening to change, said slot including an upper and lower recess extending generally the length of said slot, said blocks including flanges along their upper and lower edges and receivable in said recesses to hold said blocks in said slot and guide the movement of said blocks along said slot; and detent means releasably engageable with said blocks to retain said blocks against unintentional movement in said slots from preselected positions, said detent means including a detent bar receivable in one of said recesses and extending generally the length thereof, said bar including projections extending toward and engageable with said blocks to inhibit movement of said blocks unintentionally, said detent bar being moveable between a first position wherein said block means are free to move in said slot and a second position wherein said block means are inhibited from movement in said slot, and means for urging said bar into said second position.

15. The card according to claim 14 further including means for camming said bar to said first position upon deliberate movement of said block means along said slots.

16. The card according to claim 12 wherein said card further includes a position responsive reader enabling means comprising a stationary opening and a locus point cooperative with said stationary opening so that when said card is moveable between a plurality of light generating means and light receiving means, one of said receiving means is blocked from receiving light when said stationary opening is aligned with another of said generating and receiving means, said stationary opening being smaller than said moveable opening.

17. A logic card for use in a photo-optical conveyor code reading apparatus having a reading station including at least three light generating means and at least three light sensing means aligned respectively for receipt of light from said light generating means, said logic card being moveable through said reading station for passage intermediate said light generating and sensing means and including means for inhibiting the operation of said reading station unless said card is properly located in said reading station, said last mentioned means comprising at least one stationary opening through said card and at least one stationary locus of light blockage whereby said reading station is ineffective to take a reading unless light from one of said light generating means is received by a corresponding light sensing means and light is not received by a second light sensing means from a corresponding second light generating means, said logic card further including an adjustable readable code comprising means defining a moveable opening therein.

* * * * *